United States Patent
Gupta et al.

(10) Patent No.: US 11,259,292 B2
(45) Date of Patent: Feb. 22, 2022

(54) RESPONSE-BASED RESOURCE MANAGEMENT

(71) Applicant: QUALCOMM Incorporated, San Diego, CA (US)

(72) Inventors: Piyush Gupta, Bridgewater, NJ (US); Junyi Li, Chester, NJ (US); Chong Li, Weehawken, NJ (US)

(73) Assignee: QUALCOMM INCORPORATED, San Diego, CA (US)

( * ) Notice: Subject to any disclaimer, the term of this patent is extended or adjusted under 35 U.S.C. 154(b) by 33 days.

(21) Appl. No.: 16/259,206

(22) Filed: Jan. 28, 2019

(65) Prior Publication Data
US 2019/0254007 A1 Aug. 15, 2019

Related U.S. Application Data

(60) Provisional application No. 62/629,585, filed on Feb. 12, 2018.

(51) Int. Cl.
*H04W 4/00* (2018.01)
*H04W 72/04* (2009.01)
(Continued)

(52) U.S. Cl.
CPC .......... *H04W 72/042* (2013.01); *H04B 7/024* (2013.01); *H04L 1/0076* (2013.01); *H04L 1/1861* (2013.01); *H04L 5/001* (2013.01); *H04L 5/0055* (2013.01); *H04L 5/14* (2013.01); *H04W 40/125* (2013.01); *H04W 72/0413* (2013.01); *H04W 72/0446* (2013.01); *H04W 72/0453* (2013.01); *H04L 2001/0097* (2013.01); *H04W 84/12* (2013.01); *H04W 88/02* (2013.01)

(58) Field of Classification Search
CPC ........... H04W 72/042; H04W 72/0413; H04W 72/0446; H04W 72/0453; H04W 40/125; H04W 88/02; H04W 84/12; H04L 1/0076; H04L 1/1861; H04L 5/14; H04L 5/0055; H04L 5/001; H04L 2001/0097; H04B 7/024
USPC ........ 370/329–330, 335–345, 347–348, 436, 370/441–444, 447, 461, 462
See application file for complete search history.

(56) References Cited

U.S. PATENT DOCUMENTS

| | | | |
|---|---|---|---|
| 8,750,195 B2* | 6/2014 | Koo | H04L 43/06 370/315 |
| 10,375,649 B2* | 8/2019 | Seo | H04W 52/42 |

(Continued)

OTHER PUBLICATIONS

International Search Report and Written Opinion—PCT/US2019/015596—ISA/EPO—dated Apr. 18, 2019.

(Continued)

*Primary Examiner* — Thai D Hoang
(74) *Attorney, Agent, or Firm* — Patterson+ Sheridan, L.L.P.

(57) ABSTRACT

Certain aspects of the present disclosure provide techniques for support response-based resource management. A UE may determine an uplink response to be transmitted in response to a downlink transmission by a first TRP participating in CoMP to the UE with a second TRP. The first UE may select which of the first TRP or the second TRP to transmit the uplink response to, based at least in part on the determined uplink response and may transmit the uplink response to the selected first or second TRP.

12 Claims, 16 Drawing Sheets

(51) Int. Cl.
*H04L 5/00* (2006.01)
*H04L 5/14* (2006.01)
*H04W 40/12* (2009.01)
*H04L 1/00* (2006.01)
*H04B 7/024* (2017.01)
*H04L 1/18* (2006.01)
*H04W 88/02* (2009.01)
*H04W 84/12* (2009.01)

(56) References Cited

U.S. PATENT DOCUMENTS

| | | | |
|---|---|---|---|
| 2012/0182878 A1 | 7/2012 | Qian | |
| 2013/0114561 A1 | 5/2013 | Simonsson et al. | |
| 2014/0029584 A1* | 1/2014 | Qu | H04W 72/042 |
| | | | 370/336 |
| 2014/0177456 A1* | 6/2014 | Boudreau | H04W 72/0406 |
| | | | 370/252 |
| 2014/0219233 A1* | 8/2014 | Ahn | H04L 5/003 |
| | | | 370/329 |
| 2015/0085680 A1 | 3/2015 | Vrzic et al. | |
| 2015/0327275 A1* | 11/2015 | Kwon | H04W 28/085 |
| | | | 370/236 |
| 2017/0111280 A1* | 4/2017 | Zhang | H04W 28/0289 |
| 2018/0324852 A1* | 11/2018 | Van Phan | H04W 74/004 |
| 2019/0089498 A1* | 3/2019 | Pelletier | H04W 72/005 |
| 2019/0098657 A1* | 3/2019 | Golitschek Edler von Elbwart | H04W 72/1242 |
| 2019/0150176 A1* | 5/2019 | Pelletier | H04L 1/1812 |
| | | | 370/329 |
| 2019/0190655 A1* | 6/2019 | Pan | H04L 1/0072 |
| 2019/0200337 A1* | 6/2019 | Zhou | H04B 7/0695 |
| 2019/0229852 A1* | 7/2019 | Li | H04B 7/024 |
| 2019/0229855 A1* | 7/2019 | Li | H04L 5/0035 |

OTHER PUBLICATIONS

Mediatek Inc: "Multi-TRP and Multi-Panel Transmission", 3GPP Draft, R1-1716211 Multiple TRP Final, 3rd Generation Partnership Project (3GPP), Mobile Competence Centre, 650, Route Des Lucioles, F-06921 Sophia-Antipolis Cedex, France, vol. RAN WG1, No. Nagoya, Japan, Sep. 18, 2017-Sep. 21, 2017, Sep. 17, 2017 (Sep. 17, 2017), XP051339668, 4 Pages, Retrieved from the Internet:URL:http://www.3gpp.org/ftp/Meetings_3GPP_SYNC/RAN1/Docs/ [retrieved on Sep. 17, 2017].

* cited by examiner

800

| | PLC to S/A | Inter PLC | PLC to higher entities |
|---|---|---|---|
| RTT | 0.5 to 10ms | 4-10ms | Similar to eMBB use cases (file download, HTML) and also extends to AR/VR |
| PER Target | 10e-6 | 10e-6 | |
| Pkt Size | 40-256 bytes | 1k bytes | |
| Range | Max 100m Typical 10-15m | Typical 100m | |

FIG. 8

RESPONSE-BASED RESOURCE MANAGEMENT

CROSS-REFERENCE TO RELATED APPLICATIONS

This application claims benefit of U.S. Provisional Patent Application Ser. No. 62/629,585 filed Feb. 12, 2018, entitled "Response-Based Resource Management" which is expressly incorporated herein by reference in its entirety.

FIELD OF DISCLOSURE

Aspects of the present disclosure relate to wireless communication, and more particularly, to response-based resource management. As described herein, aspects may be practiced in a factory environment and/or ultra reliable and low latency communications (URLLC).

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an e NodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure generally relate to methods and apparatus for supporting response-based resource management.

Based, at least in part, on an UL response to be transmitted (e.g., acknowledgment or negative acknowledgement), in response to a DL transmission, a UE may determine which of a first or second TRP to transmit the response to. The first and second TRPs may be associated with different time-frequency resources, in an effort to minimize interference.

Based, at least in part, on a DL response to be transmitted (e.g., acknowledgment or negative acknowledgement) in response to an UL transmission by a UE, TRPs may determine which of the first or second TRP will transmit the response to the UE. In some aspects, the first and second TRPs may be associated with different time-frequency resources, in an effort to minimize interference.

Certain aspects of the present disclosure provide a method for wireless communication that may be performed, for example, by a UE. The method generally includes determining an uplink response to be transmitted in response to a downlink transmission by a first transmit/receive point (TRP) participating in coordinated multipoint (CoMP) transmissions to the UE with a second TRP, selecting which of the first TRP or the second TRP to transmit the uplink response to, based at least in part on the determined uplink response, and transmitting the uplink response to the selected first or second TRP.

Certain aspects of the present disclosure provide a method for wireless communication that may be performed, for example, by a first TRP. The method generally includes determining a negative acknowledgement (NACK) to be transmitted to a user equipment (UE) in response to an uplink transmission by the UE, and transmitting, to a second TRP, an indication of the NACK to be transmitted, wherein the first TRP participates in coordinated multipoint (CoMP) transmissions to the UE with the second TRP.

Certain aspects of the present disclosure provide a method for wireless communication that may be performed, for example, by a second TRP. The method generally includes receiving an indication of a negative acknowledgment (NACK) to be transmitted to a user equipment (UE) in response to an uplink transmission from the UE to a first TRP, wherein the second TRP participates in coordinated multipoint (CoMP) transmissions to the UE with the first TRP, and transmitting the NACK to the UE based, at least in part, on the indication.

Certain aspects of the present disclosure provide an apparatus for wireless communication that may be performed, for example, by a UE. The apparatus generally includes means for determining an uplink response to be transmitted in response to a downlink transmission by a first transmit/receive point (TRP) participating in coordinated multipoint (CoMP) transmissions to the UE with a second TRP, means for selecting which of the first TRP or the second TRP to transmit the uplink response to, based at least in part on the determined uplink response, and means for transmitting the uplink response to the selected first or second TRP.

Certain aspects of the present disclosure provide an apparatus for wireless communication that may be performed, for example, by a first TRP. The apparatus generally includes means for determining a negative acknowledgement (NACK) to be transmitted to a user equipment (UE) in response to an uplink transmission by the UE, and means for transmitting, to a second TRP, an indication of the NACK to be transmitted, wherein the first TRP participates in coordinated multipoint (CoMP) transmissions to the UE with the second TRP.

Certain aspects of the present disclosure provide an apparatus for wireless communication that may be performed, for example, by a second TRP. The apparatus generally includes means for receiving an indication of a negative acknowledgment (NACK) to be transmitted to a user equipment (UE) in response to an uplink transmission from the UE to a first TRP, wherein the second TRP participates in coordinated multipoint (CoMP) transmissions to the UE with the first TRP, and means for transmitting the NACK to the UE based, at least in part, on the indication.

Certain aspects of the present disclosure provide an apparatus for wireless communication that may be performed, for example, by a UE. The apparatus includes at least one processor and a memory coupled to the at least one processor. The at least one processor is configured to determine an uplink response to be transmitted in response to a downlink transmission by a first transmit/receive point (TRP) participating in coordinated multipoint (CoMP) transmissions to the UE with a second TRP, select which of the first TRP or the second TRP to transmit the uplink response to, based at least in part on the determined uplink response, and transmit the uplink response to the selected first or second TRP.

Certain aspects of the present disclosure provide an apparatus for wireless communication that may be performed, for example, by a first TRP. The apparatus includes at least one processor and a memory coupled to the at least one processor. The at least one processor is configured to determine a negative acknowledgement (NACK) to be transmitted to a user equipment (UE) in response to an uplink transmission by the UE, and transmit, to a second TRP, an indication of the NACK to be transmitted, wherein the first TRP participates in coordinated multipoint (CoMP) transmissions to the UE with the second TRP.

Certain aspects of the present disclosure provide an apparatus for wireless communication that may be performed, for example, by a second TRP. The apparatus includes at least one processor and a memory coupled to the at least one processor. The at least one processor is configured to receive an indication of a negative acknowledgment (NACK) to be transmitted to a user equipment (UE) in response to an uplink transmission from the UE to a first TRP, wherein the second TRP participates in coordinated multipoint (CoMP) transmissions to the UE with the first TRP, and transmit the NACK to the UE based, at least in part, on the indication.

Certain aspects of the present disclosure provide a computer readable medium for wireless communication by a UE comprising instructions stored thereon for determining an uplink response to be transmitted in response to a downlink transmission by a first transmit/receive point (TRP) participating in coordinated multipoint (CoMP) transmissions to the UE with a second TRP, selecting which of the first TRP or the second TRP to transmit the uplink response to, based at least in part on the determined uplink response, and transmitting the uplink response to the selected first or second TRP.

Certain aspects of the present disclosure provide a computer readable medium for wireless communication that may be performed, for example, by a first TRP comprising instructions stored thereon for determining a negative acknowledgement (NACK) to be transmitted to a user equipment (UE) in response to an uplink transmission by the UE, and transmitting, to a second TRP, an indication of the NACK to be transmitted, wherein the first TRP participates in coordinated multipoint (CoMP) transmissions to the UE with the second TRP.

Certain aspects of the present disclosure provide a computer readable medium for wireless communication that may be performed, for example, by a second TRP comprising instructions stored thereon for receiving an indication of a negative acknowledgment (NACK) to be transmitted to a user equipment (UE) in response to an uplink transmission from the UE to a first TRP, wherein the second TRP participates in coordinated multipoint (CoMP) transmissions to the UE with the first TRP, and transmitting the NACK to the UE based, at least in part, on the indication.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 8 illustrates example requirements associated with the example communication environment illustrated in FIG. 7.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
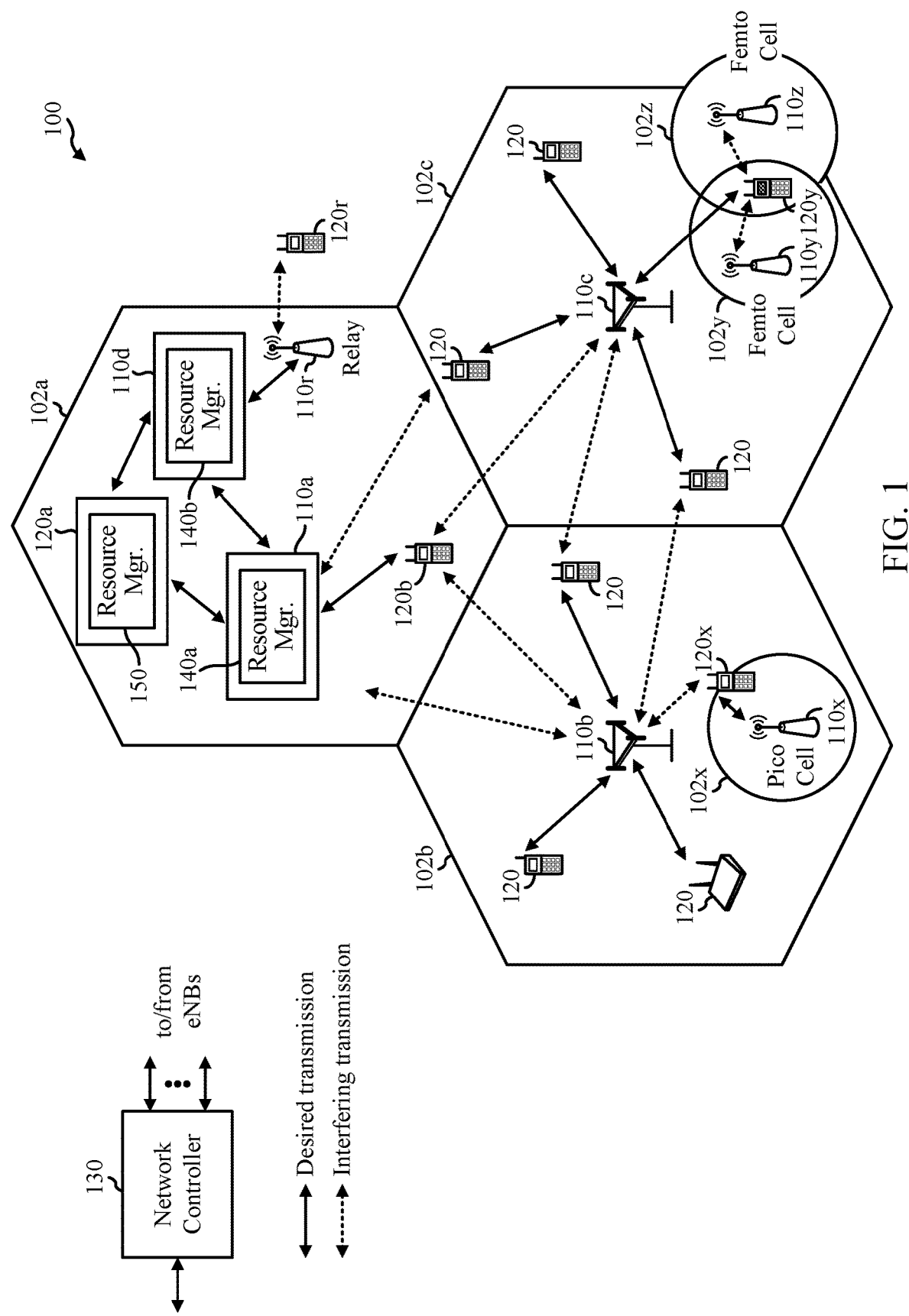
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g., 80 MHz beyond), millimeter wave (mmW) targeting high carrier frequency (e.g., 60 GHz), massive MTC (mMTC) targeting non-backward compatible MTC techniques, and/or mission critical techniques targeting ultra reliable low latency communications (URLLC). These services may include latency and reliability requirements. These services may also have different transmission time intervals (TTI) to meet respective quality of service (QoS) requirements. In addition, these services may co-exist in the same subframe.

Aspects of the present disclosure provide methods and apparatus for response-based resource management. Response-based resource management provides increased reliability for a response transmission (ACK/NACK), by taking into account channel conditions associated with the first transmission (or, depending on point of view, the first reception). Based on a response to be transmitted, a UE may determine which TRP to transmit the response to.

As an example, a first TRP may transmit a first downlink transmission to a UE. In response to the first DL, the UE may determine a NACK is to be transmitted. A NACK may imply that a poor channel exists between the UE and the first TRP. During poor channel conditions, or environments that have stringent reliability requirements, the first TRP may not receive the NACK. Factory automation setting or URLLC, for example, have stringent reliability requirements. According to aspects, the UE may transmit the NACK to a second TRP. The first and second TRP may participate in CoMP communication with the UE. The first and second TRPs may be associated with different time-frequency resources. The second TRP may transmit an indication of the NACK to the first TRP.

In another example, a UE may transmit an UL message to a first TRP. Based on a DL response to be transmitted in response to the UL transmission, the first TRP may refrain from transmitting the response. Instead, the second TRP may transmit the response to the UE. If the DL response is a NACK, the channel between the UE and the first TRP may not meet stringent reliability requirements. Therefore, the first TRP may refrain from sending the NACK. Instead, the second TRP may transmit the NACK. The first and second TRPs may participate in CoMP communication with the UE. The first and second TRPs may be associated with different time-frequency resources.

The methods and apparatus described herein increase reliability for a receiving a response by taking into account the channel conditions of the first transmission. This may be particularly important in environments having stringent latency and reliability requirements.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100 in which aspects of the present disclosure may be performed. For example, the wireless network may be a new radio (NR) or 5G network. According to aspects of the present disclosure, UEs and TRPs may perform response-based resource management.

Figure 9:
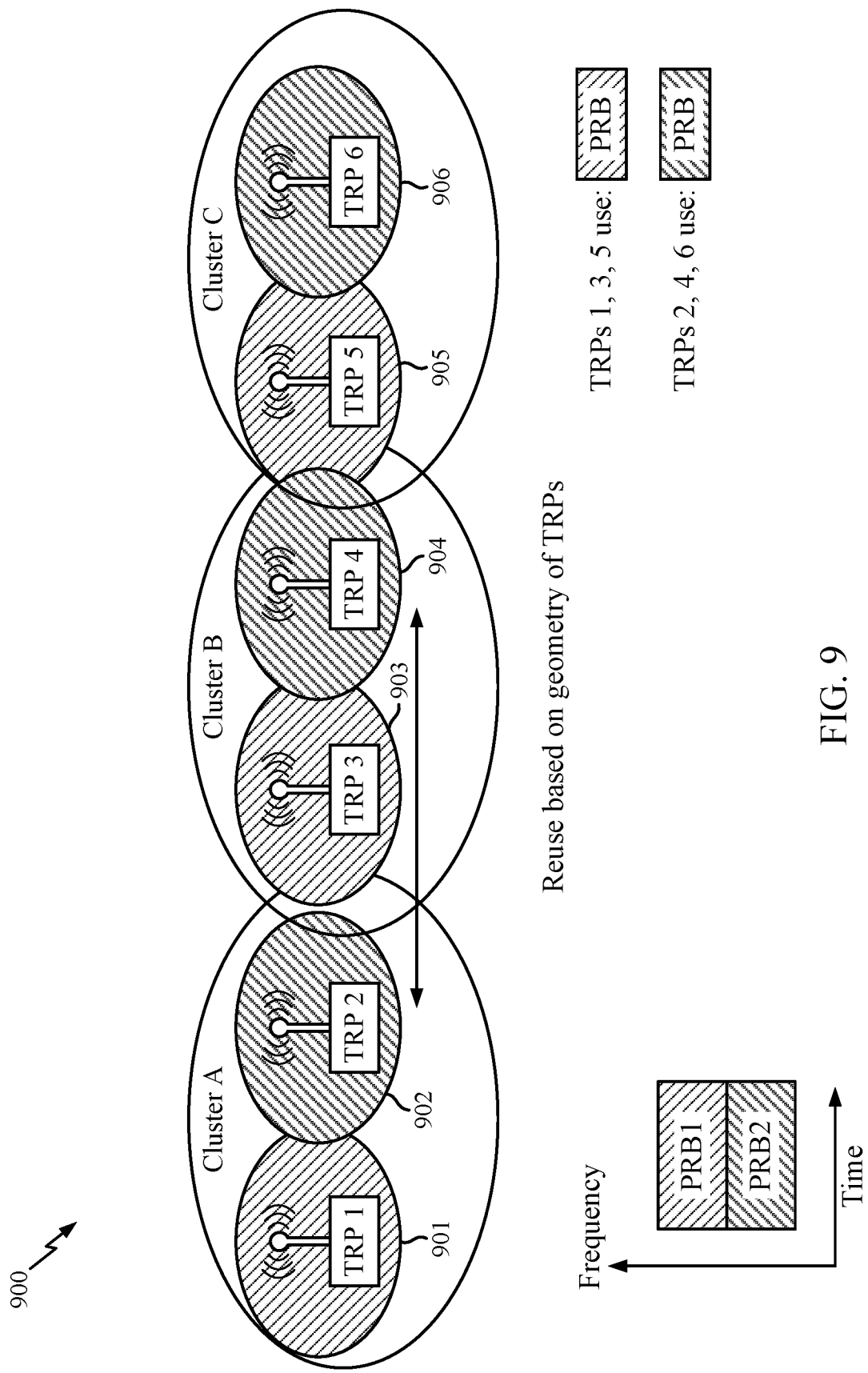
FIG. 9 illustrates an example of CoMP clusters, in accordance with certain aspects of the present disclosure.

As will be described in more detail herein, a UE may be located in a coverage area of a CoMP cluster including two TRPs (for example 110a, 110d). CoMP transmission by two TRPs is also illustrated in FIG. 9.

A first TRP may transmit a DL transmission to the UE. If the UE determines an UL NACK is to be transmitted in response to the first transmission, the UE may transmit the NACK to the second TRP in the cluster.

A first TRP 110a and a second TRP 100d may participate in CoMP transmission to the UE 120a. The first TRP 110a transmits a DL transmission to the UE. The UE may determine an uplink response to be transmitted in response to the downlink transmission. The UE may select which of the first TRP 110a or the second TRP 110d to transmit the uplink response to, based at least in part on the determined uplink response. The UE may transmit the uplink response to the selected first or second TRP.

As another example, the UE may transmit an UL message to the first TRP 110a. If the first TRP determines a DL NACK is to be transmitted in response to the first transmission, the first TRP 110a may refrain from transmitting the NACK, since the channel condition between the UE and the first TRP may be poor. Instead, the second TRP 110d may transmit the NACK.

The first TRP 110a may determine a NACK to be transmitted to a UE 120a in response to an uplink transmission by the UE. The first TRP 110a transmits, to a second TRP 110d, an indication of the NACK to be transmitted, wherein the first TRP participates in CoMP transmissions to the UE with the second TRP. The indication may be transmitted via the network controller 130 or directly between the first and second TRPs.

The second TRP 110d may receive an indication of a NACK to be transmitted to a UE 120a in response to an uplink transmission from the UE to a first TRP 110a, wherein the second TRP participates in CoMP transmissions to the UE with the first TRP. The second TRP 110d may transmit the NACK to the UE based, at least in part, on the indication.

UEs 120 may be configured to perform the operations 1000 and other methods described herein and discussed in more detail below response-based resource management. Base station (BS) 110 may comprise a transmission reception point (TRP), Node B (NB), 5G NB, access point (AP), new radio (NR) BS, etc.). The NR network 100 may include the central unit. The first TRP 110a may perform the operations 1200 and other operations described herein and the second TRP 110d may perform the operations 1300 and other operations described herein.

As an example, to aspects, the TRPs 110a, 110d and the UE 120a may each include a resource manager module 140a, 140b, and 150, respectively. The resource manager may assist in response-based resource management. The resource manager may be a separate entity or may be incorporated within any one or more modules illustrated, for example in FIGS. 4, 15, and 16. As an example, the resource manager may be part of the controller/processor 440, 480, processors 1504, 1604, processing system 1502, 1602 and/or the transceiver 432, 454, 1508, 1608. In the UE, the resource manager may determine to which TRP to transmit the UL response. In the TRPs, the resource manager may determine which one of the first or second TRP should transmit the DL response to the UE.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a subcarrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and one or more DUs. A NR BS (e.g., gNB, 5G Node B, Node B, TRP, access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
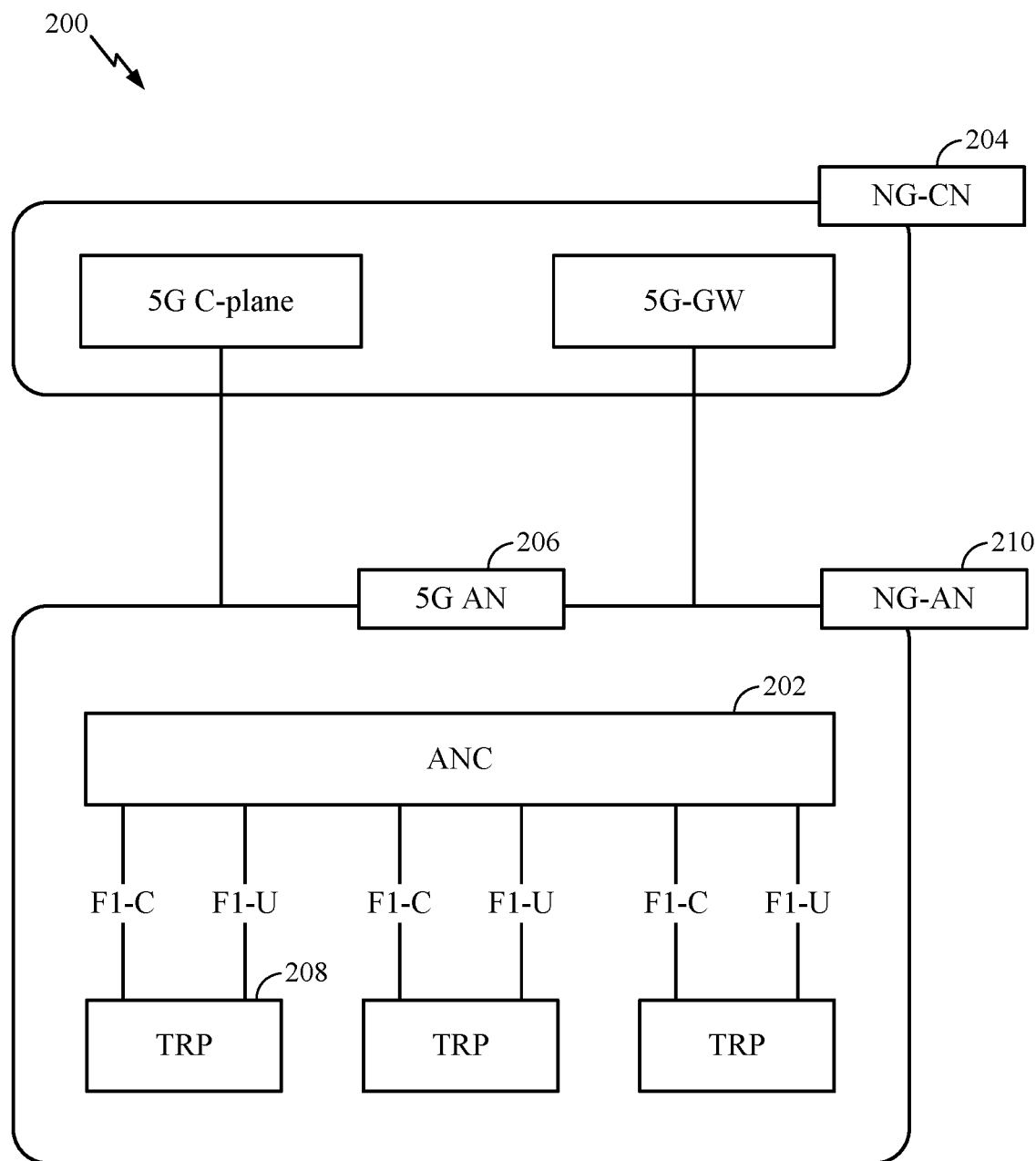
FIG. 2 is a block diagram illustrating an example logical architecture of a distributed RAN, in accordance with certain aspects of the present disclosure.

FIG. 2 illustrates an example logical architecture of a distributed RAN 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be present within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
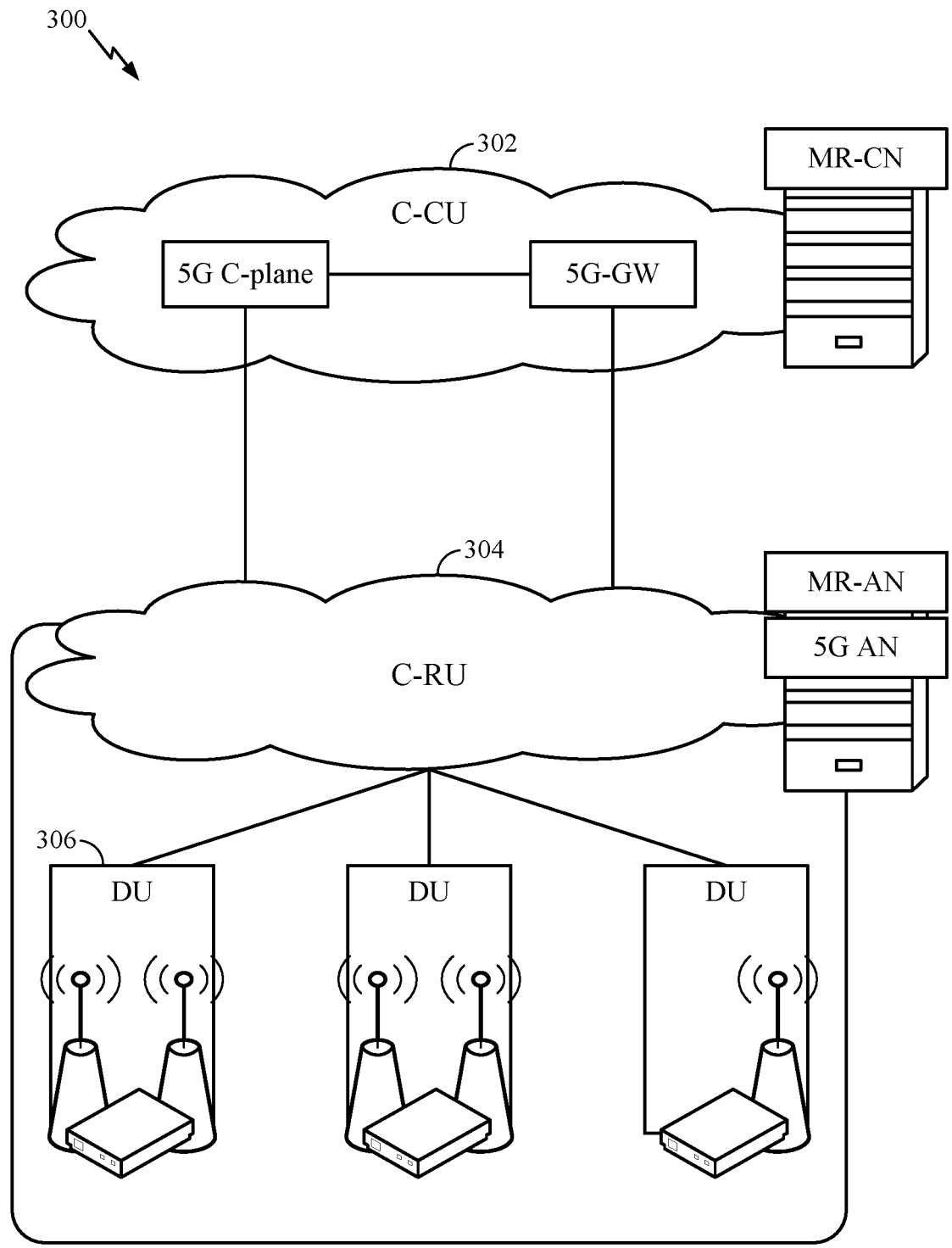
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
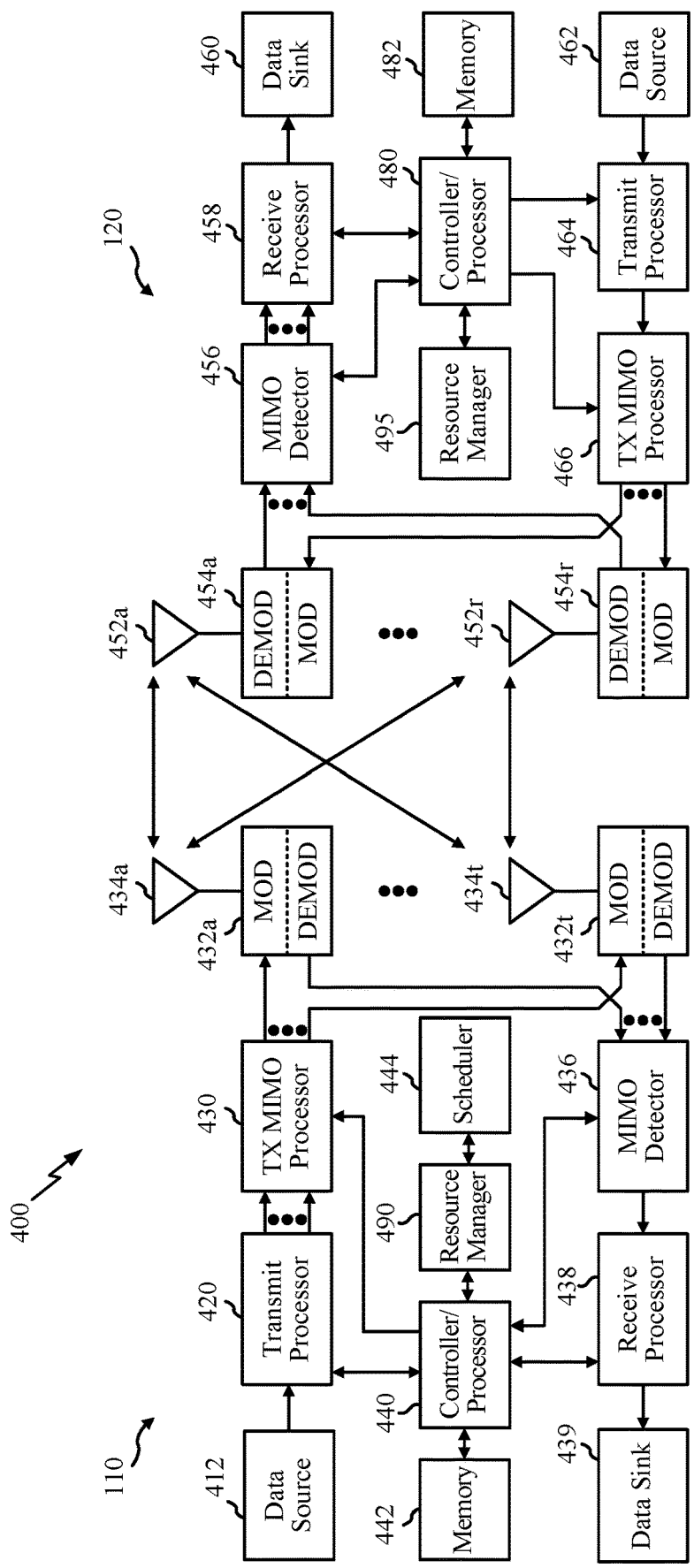
FIG. 4 is a block diagram conceptually illustrating a design of an example TRP and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 454, processors 458, 464, 466, and/or controller/processor 480 of the UE 120 and/or antennas 434, Tx/Rx 432, processors 420, 430, 438, and/or controller/processor 440 of the BS 110 may be used to perform the operations described herein and illustrated with reference to FIGS. 9-14.

As described above, the BS and the UE may include a resource manager 490, 495, respectively. According to an example, the resource manager may be configured assist in response-based resource management. While the resource manager is illustrated as a separate entity in FIG. 4, according to certain aspects, the resource manager may be incorporated in one or more other modules at the BS and UE. As an example, the resource manager module may be part of the controller/processor and/or the transceiver.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIGS. 12 and 13, and/or other processes for the techniques described herein. The processor 480 and/or other processors and modules at the UE 120 may also perform or direct, e.g., the execution of the functional blocks illustrated in FIG. 10, and/or other processes for the techniques described herein. The memories 442 and 482 may store data and program codes for the BS 110 and the UE 120, respectively. A scheduler 444 may schedule UEs for data transmission on the downlink and/or uplink.

Figure 5:
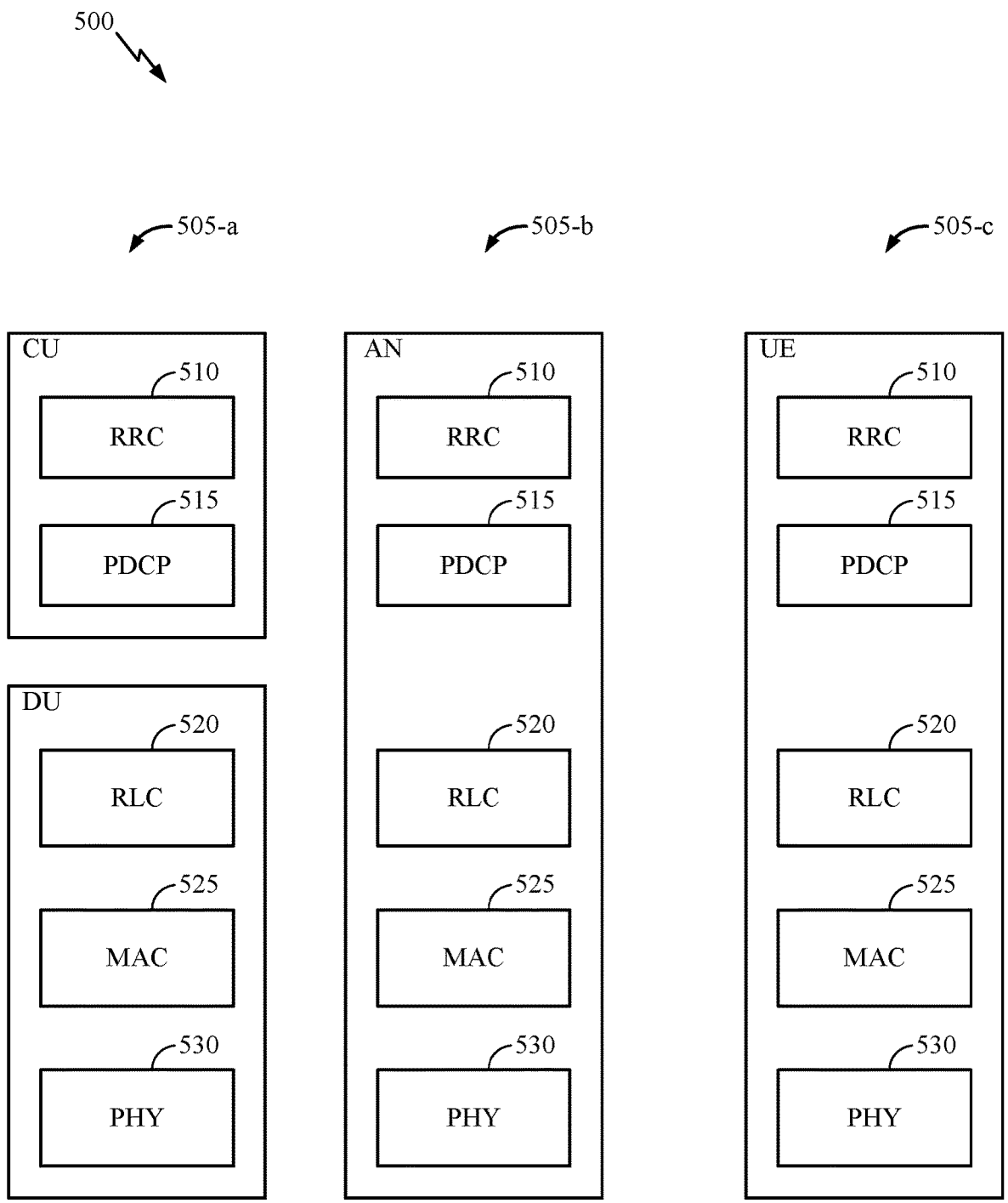
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data. Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the CU, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530) as shown at 505-c.

Figure 6:
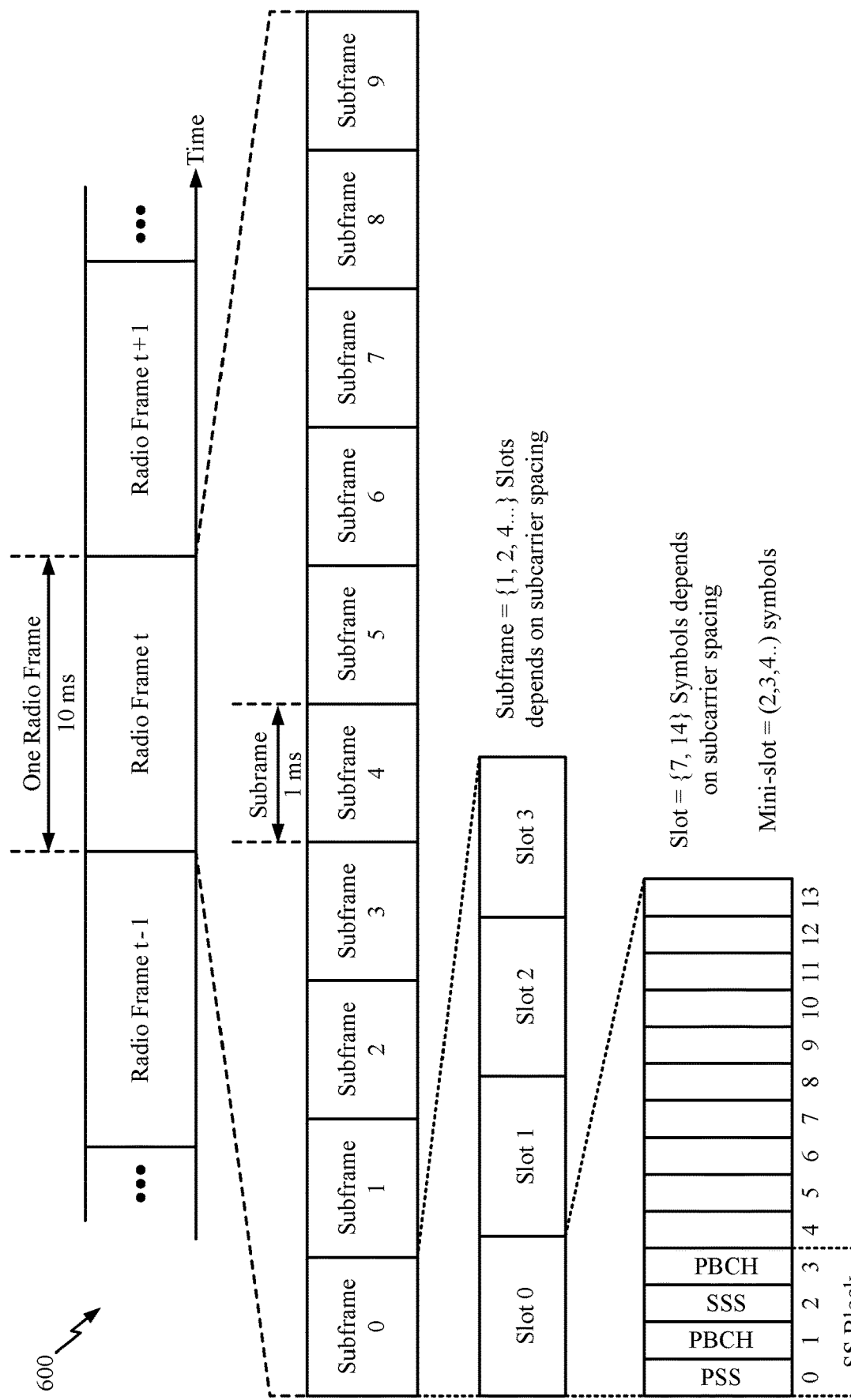
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot is a subslot structure (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Response-Based Resource Management

Figure 7:
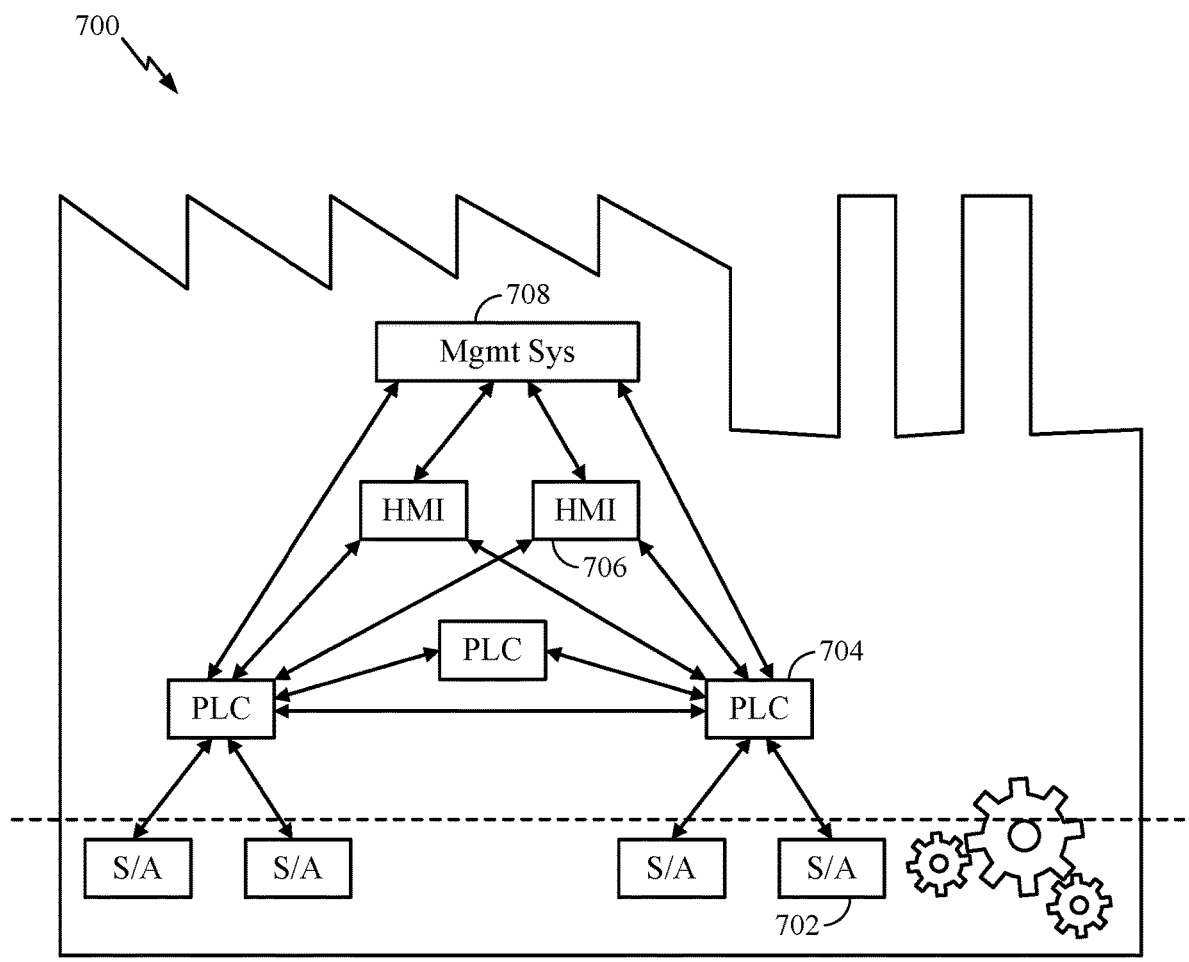
FIG. 7 illustrates an example of a wireless communication environment, in accordance with certain aspects of the present disclosure.

In an example factory automation scenario, multiple levels of connectivity exist. FIG. 7 illustrates an example factory automation scenario 700, in accordance with certain aspects of the present disclosure. Sensors and actuators (S/A) 702 occupy the lowest level. Examples of S/A include rotary motor devices, linear servo, and position sensors. The S/A 702 are controller by Programmable Logic Controllers (PLC) 704. The PLCs include custom hardware which issue a series of commands and receive sensor input in real time. As an example, the PLC issues a motion command and receives position inputs in real-time. The PLCs 704 are interconnected and coordinate with other PLCs. The PLCs 704 are also interfaced to Human Machine Interfaces (HMI) 706. Example HMIs include tablets, panels, and wearables. HMIs 706 provide machine control at the factory floor (e.g., start/stop), change modes (e.g., from "widget1" to "widget2"), and provide augmented reality/virtual reality (AR/VR) interfaces. A Management System 708, which may be running on an industrial PC, provides overall software and security management, flow management, and long-term key performance indicators (KPI) monitoring.

FIG. 8 illustrates example requirements associated with factory automation scenarios, such as the environment illustrated in FIG. 7. In an example, the latency requirement is particularly stringent as compared to traditional wireless networks. As an example, round trip time (RTT) between the PLC 704 and S/A 702 may be approximately 0.5 ms to 10 ms. URLLC also targets a RTT of 0.5 to 10 ms. The reliability requirement may also be stringent. In an example, the packet error rate (PER) target may be $10^{-6}$. In certain scenarios, the PER may be as stringent at $10^{-9}$. In the factory automation scenarios, the packet sizes tend to be small (e.g., 40-256 bytes) and the range of communication between the S/As and PLCs may be around 100 meters. While aspects of the present disclosure address the URLLC and factory deployment scenarios, they may be used in any wireless communication environment.

CoMP is further refined in NR (5G). A first type of CoMP is Coordinated Scheduling/Coordinated Beamforming (CS/CB), where multiple TRPs coordinate to share channel state information (CSI) for multiple UEs. In CS/CB, data packets are transmitted from only one TRP. If a UE is likely to experience excess interference from a neighboring TRP, the neighboring TRP may either not schedule a transmission that may cause interference at the UE or the neighboring TRP may perform beamforming away from the UE, so as to reduce interference experienced by the UE.

A second type of CoMP is Joint Transmission (JT). In JT, multiple TRPs simultaneously transmit the same data with appropriate beamforming weights. As the name implies, multiple TRPs are actively participating by transmitting to the UE.

Dynamic Point Selection (DPS) is a specific form of JT. Transmission of beamformed data for a given UE is performed by a single TRP at each time instance. The single TRP that is transmitting at any given time may be dynamically switched on a per-slot or per-subframe basis. DPS provides diversity because there are multiple transmissions involved for the same data packet.

In LTE and NR, one goal is to improve capacity and achieve a higher rate on average. Aspects of the present disclosure address a goal of higher reliability in a CoMP scenario. As described with reference to FIG. 8, in the factory scenario and for URLLC, a key characteristic is the PER target is as low as a probability of $10^{-6}$ or even $10^{-9}$. To achieve higher reliability, resource management across different transmissions and different TRPs for data and for control messaging including ACK/NACK feedback may be performed as described herein. Resource management may help ensure high reliability for data and control transmissions. The method and apparatus described herein address ACK/NACK transmissions and re-transmission resource allocation across TRPs to achieve high reliability.

FIG. 9 illustrates an example of three CoMP clusters in a factory environment 900, according to aspects of the present disclosure. Multiple cells may exist in a factory environment. A cell may refer to one or more PLCs controlling one or more S/As in the PLC's local cell. Different cells are served by multiple TRPs (e.g., PLCs). Therefore, each UE (e.g., S/A) may be in a coverage area of a cluster of TRPs.

The cluster of TRPs may be a combination or subset of TRPs that are close by or in the vicinity of the UE such that the TRPs may participate in CoMP transmissions with the UE.

CoMP clusters have TRPs as well as time-frequency resources. The resource allocation may be semi-static and employ spatial reuse, wherein the same resources are not used in adjacent or neighboring sectors for interference management. Examples of time-frequency resources include physical resource blocks.

In FIG. 9, Cluster A, Cluster B, and Cluster C co-exist spatially on a large factory floor. Resources are pre-assigned to the TRPs of each cluster. TRP 901 in Cluster A uses different time-frequency resources than TRP 902 in Cluster A. TRP 903 in Cluster B, which is adjacent to TRP 902 in Cluster A, uses different time-frequency resources than TRP 902. Based on the geometry of the TRP locations, TRPs 901 and 903 may use the same (or similar) time-frequency resources. Following this logic, TRPs 901, 903, and 905 use a same or similar set of time-frequency resources, such as PRB1 and TRPs 902, 904, and 906 use a same or similar set of time-frequency resources, such as PRB2. The resources used by TRP 901, 903, and 905 are different than the resources uses by TRP 902, 904, and 906 to manage interference across TRPs.

The response-based resource management is based, at least in part, on a first transmission. The first transmission (DL or UL) targets a specific block error ratio (BLER). The BLER may be aggressive, therefore response-resources may be well utilized if the channel between the TRP and UE is good. However, if the channel between the TRP and the UE is not good, then further communication using initial channel should be limited in an effort to meet stringent latency requirements. A higher reliability for subsequent transmissions is achieved by taking into account the channel conditions associated with the initial transmission.

As described with reference to FIG. 9, in an effort to address the use of reliably transmitting and receiving information, neighboring TRPs in a multi-TRP scenario are allocated orthogonal time/frequency resources to minimize interference and increase PUCCH readability. As described in more detail herein, although a UE usually sends PUCCH on resource 1 to TRP1, if the UE knows its channel with TRP1 is poor, then UE sends the PUCCH on resource 2, which is monitored by TRP2. In this example, resource 2 may be known as a supplementary resource.

Figure 10:
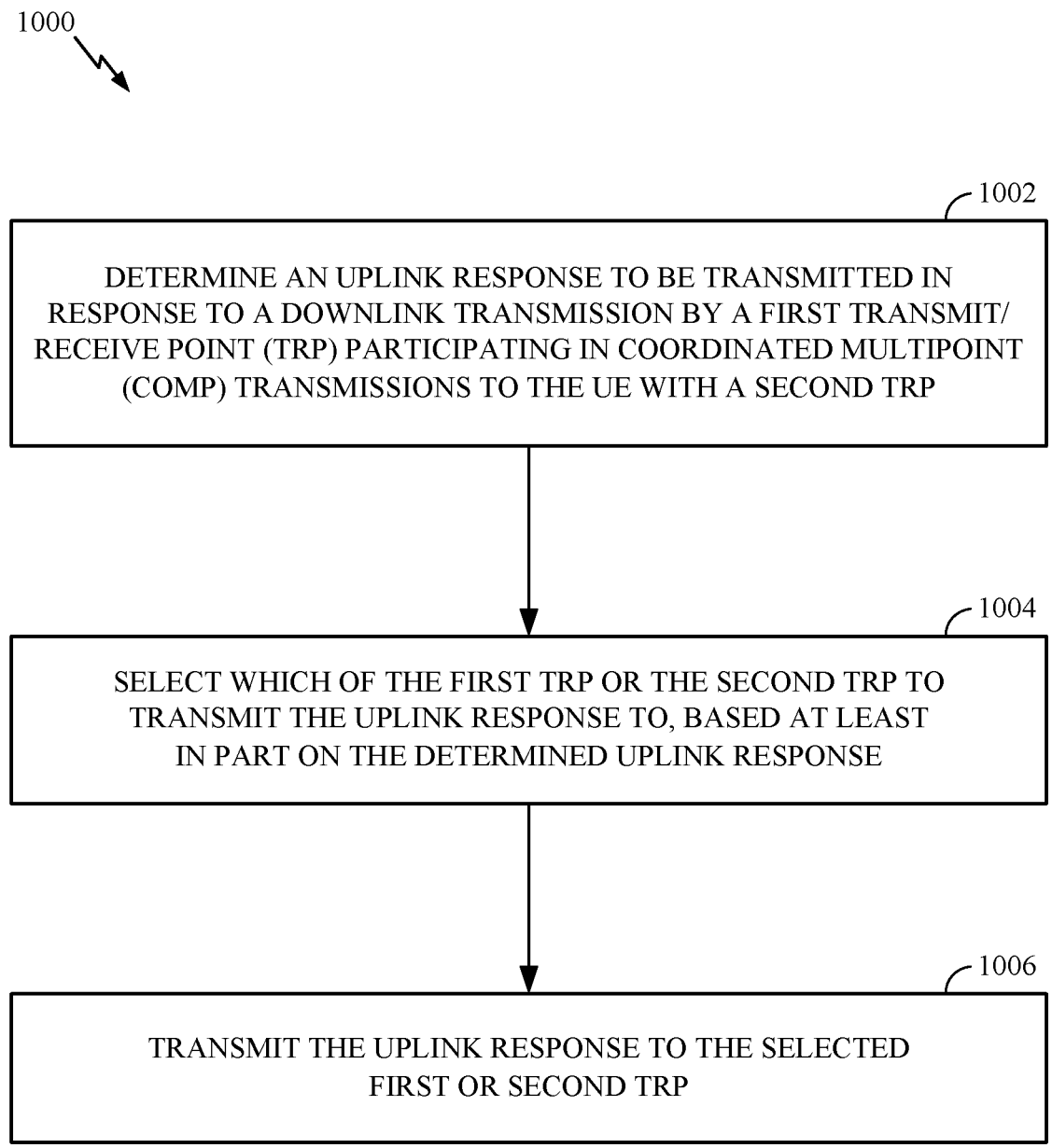
FIG. 10 illustrates example operations performed by a UE, in accordance with certain aspects of the present disclosure.

FIG. 10 illustrates example operations 1000 that may be performed by a UE. The UE may be UE 120a which may include one or more modules of UE 120 illustrated in FIG. 4. According to aspects the UE may be the UE 1500 illustrated in FIG. 15 including one or more components configured to perform the operations described herein.

At 1002, the UE may determine an uplink response to be transmitted in response to a downlink transmission by a first TRP participating in CoMP transmissions to the UE with a second TRP. At 1004, the UE may select which of the first TRP or the second TRP to transmit the uplink response to, based at least in part on the determined uplink response. At 1006, the UE may transmit the uplink response to the selected first or second TRP.

Figure 11:
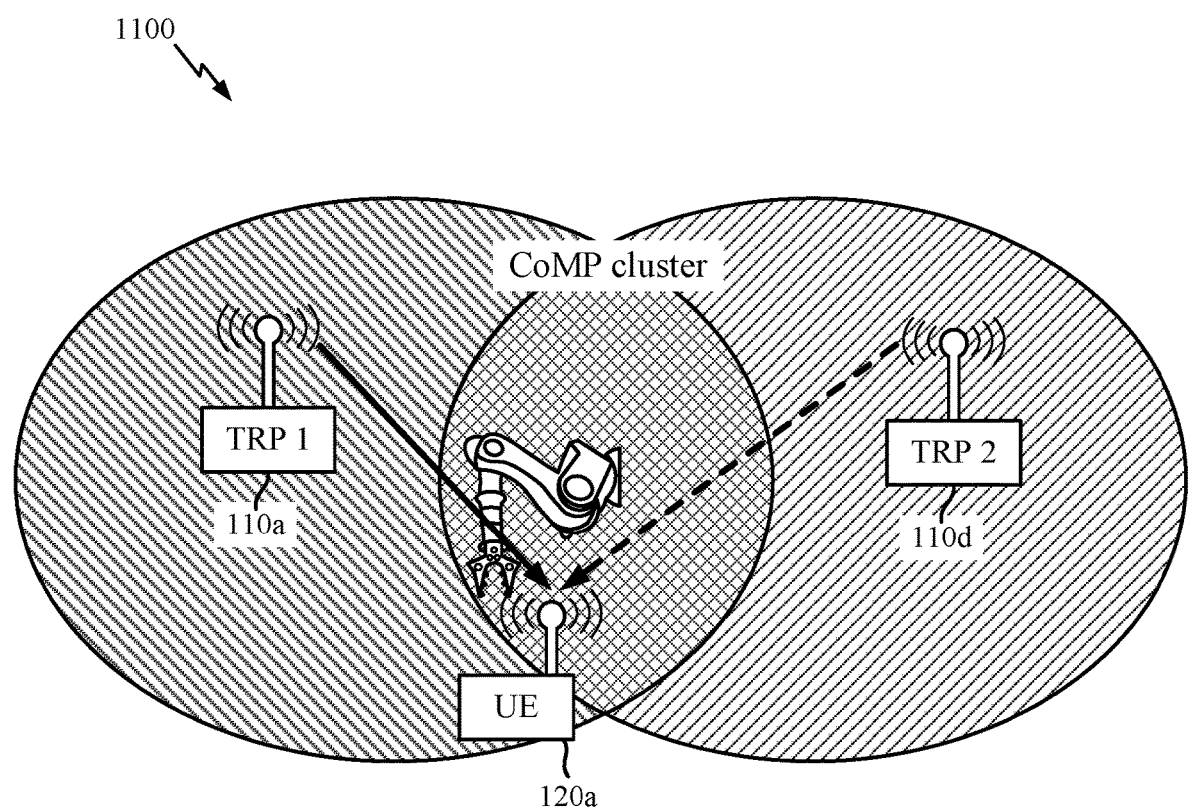
FIG. 11 illustrates an example UE, first TRP, and second TRP, in accordance with certain aspects of the present disclosure.

FIG. 11 illustrates an example UE 120a, first TRP 110a, and second TRP 110d. The first TRP 110a transmits a first DL transmission to the UE.

Traffic in the factory environment is periodic. Accordingly, the initial transmission is based on semi-persistent scheduling (SPS). Because of SPS transmissions, the UE is not required to decode a PDCCH.

If the UE determines an ACK is to be transmitted in response to the DL transmission from the first TRP 11a, the UE transmits to ACK using the resources assigned to the first TRP 110a.

If the UE is not able to decode its scheduled transmission, it may determine the uplink response to be transmitted is a NACK. According to aspects, the UE may determine that it did not receive or properly decode the first transmission from the first TRP. Accordingly, the UE may determine a NACK is to be transmitted. If the UE determines a NACK is to be transmitted, it transmits the NACK to the second TRP 110d, using the resources assigned to the second TRP.

Because the UE did not successfully decode the DL transmission from the first TRP 110a, the channel between the first TRP 110a and the UE 120a may fall below a signal quality threshold value. Therefore, the UE transmits the NACK using the resources assigned to the second TRP in an effort to ensure that the uplink response (e.g., the NACK) is successfully received by the network.

In one example, as illustrated in FIG. 11, the robotic arm may block the DL transmission from the first TRP 110a to the UE 120a. Movement of the robotic arm may be slow relative to a slot duration. Therefore, the UE transmits the NACK to the second TRP 110d. The first and second TRPs may communicate via a controller (e.g., 130) and/or a backhaul connection.

After the UE 120a transmits the NACK to the second TRP 110d using the time-frequency resources assigned to the second TRP, the second TRP may transmit a retransmission of a downlink control channel, such as a PDCCH, to the UE. Additionally, or alternatively, the second TRP may retransmit the initial downlink transmission (that was transmitted by the first TRP). Transmission of the downlink control channel or a retransmission of the initial downlink transmission by the second TRP, as opposed to the first TRP, provides higher reliability the UE will receive the transmission.

Figure 12:
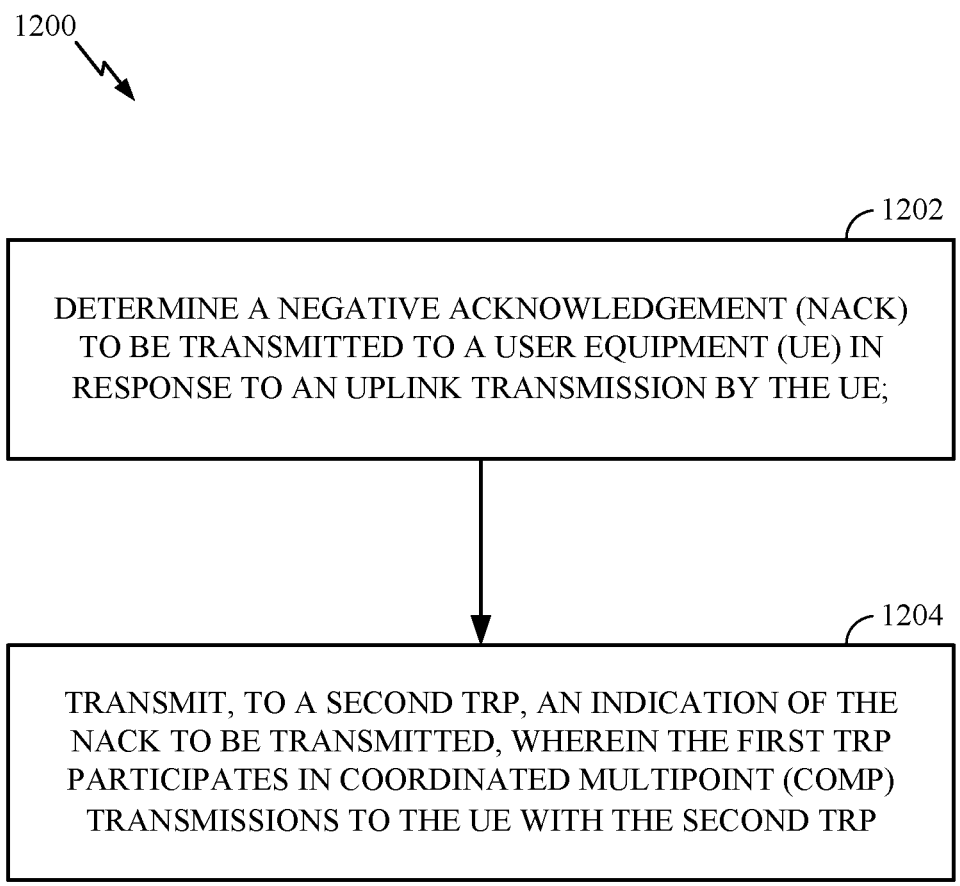
FIG. 12 illustrates example operations performed by a first TRP, in accordance with certain aspects of the present disclosure.

FIG. 12 illustrates example operations 1200 that may be performed by a first TRP. The first TRP may be TRP 110a which may include one or more modules of TRP 110 illustrated in FIG. 4. According to aspects the TRP may be the TRP 1600 illustrated in FIG. 16 including one or more components configured to perform the operations described herein. The first TRP and a second TRP may participate in CoMP communication to a UE.

At 1202, the first TRP may determine a NACK is to be transmitted to a UE in response to an uplink transmission by the UE. At 1204, the first TRP may transmit, to a second TRP, an indication of the NACK to be transmitted, wherein the first TRP participates in CoMP transmissions to the UE with the second TRP.

Figure 13:
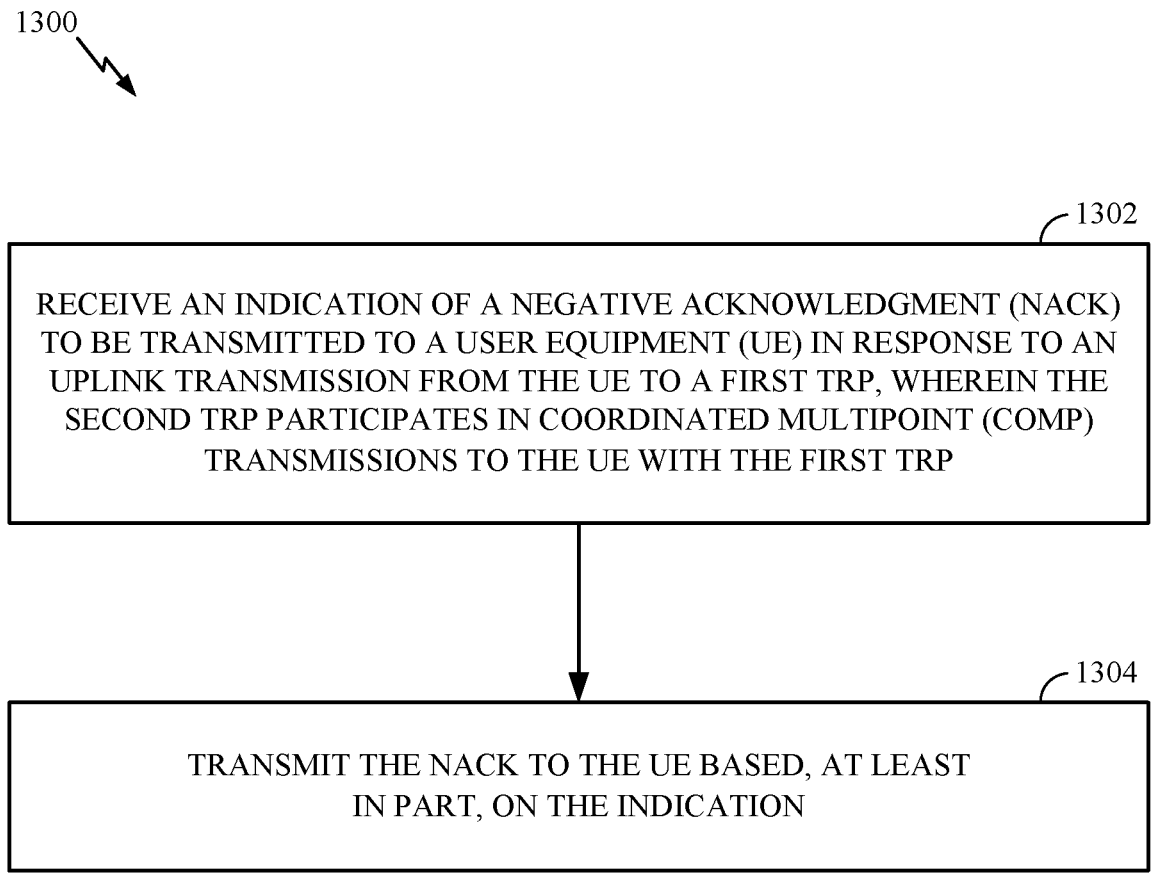
FIG. 13 illustrates example operations performed by a second TRP, in accordance with certain aspects of the present disclosure.

FIG. 13 illustrates example operations 1300 that may be performed by a second TRP. The second TRP may be TRP 110d which may include one or more modules of TRP 110 illustrated in FIG. 4. According to aspects the TRP may be the TRP 1602 illustrated in FIG. 16 including one or more components configured to perform the operations described herein. In aspects, the second TRP participates in CoMP communication.

At 1302, the second TRP may receive an indication of a NACK to be transmitted to a UE in response to an uplink transmission from the UE to a first TRP. The second TRP participates in CoMP transmissions to the UE with the first TRP. At 1304, the second TRP may transmit the NACK to the UE based, at least in part, on the indication.

A first TRP receives an initial UL transmission from a UE. If an ACK is to be transmitted to the UE, the first TRP transmits the ACK using resources assigned to the first TRP. However, if the first TRP determines that it did not correctly decode the UL transmission, the DL response (e.g., NACK) is transmitted by the second TRP. The first TRP refrains from transmitting the NACK because the channel between the first TRP and the UE may be poor. The second TRP transmits the NACK using resources assigned to the second TRP. Additionally, the second TRP may transmit the PDCCH on the resources assigned to the second TRP. In one example, the second TRP transmits a resource allocation for UE's re-transmission. The resource allocation may be transmitted on a DL control channel, such as a PDCCH on a resource belonging to the second TRP.

Figure 14:
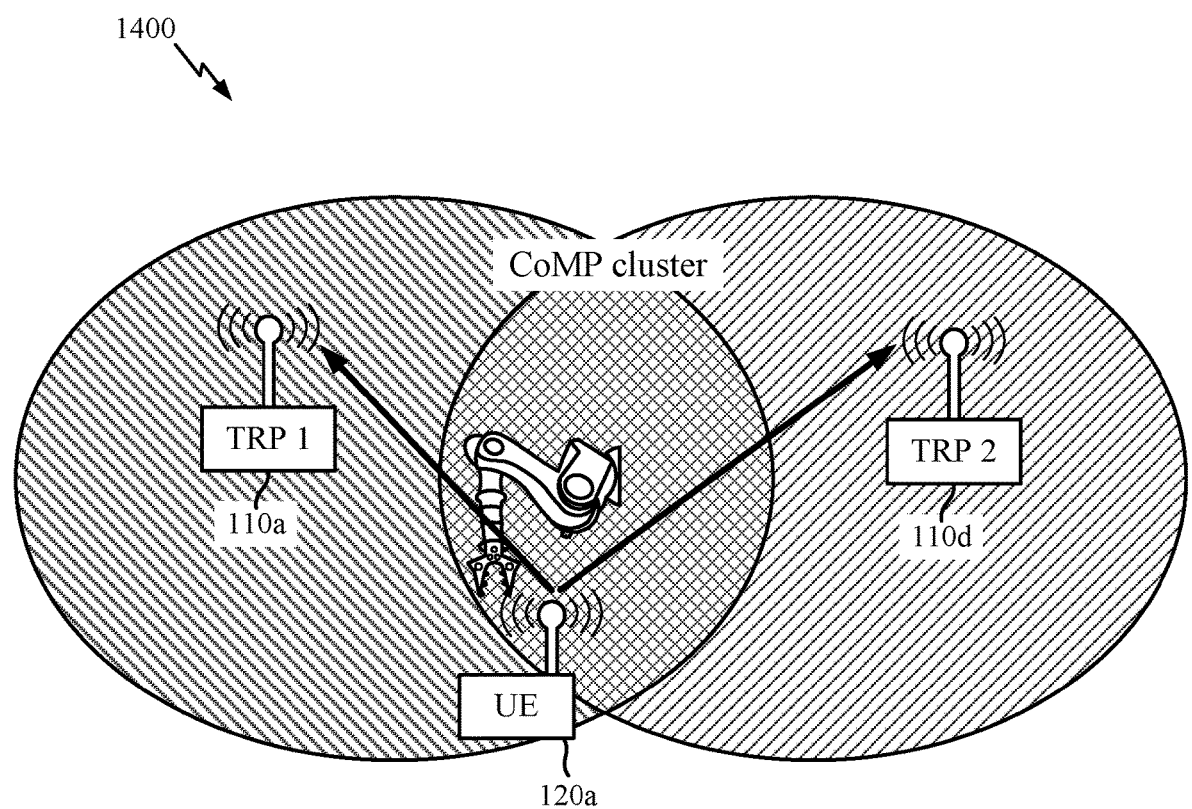
FIG. 14 illustrates an example UE, first TRP, and second TRP, in accordance with certain aspects of the present disclosure.

FIG. 14 illustrates an example UE 120a, first TRP 110a, and second TRP 110d. The UE 120a transmits an UL transmission to the first TRP 110d. Based on whether the first TRP 110a is able to decode the UL transmission, one of the first or second TRPs 110a, 110d may transmit the DL response. If the first TRP 110a is able to decode the UL transmission, it transmits the ACK to the UE using resources assigned to the first TRP. If the first TRP 110a is not able to decode the UL transmission, the first TRP will not transmit the NACK, as the channel between the UE and the first TRP may be poor. The first TRP may indicate to the second TRP 110d (via a network controller, or backhaul link) to transmit the NACK to the UE. The second TRP 110d may transmit the NACK.

Thus, as described herein, based on whether an ACK or NACK is to be transmitted, a UE may determine which resources to use for transmission. Similarly, TRPs may determine the resources to be used for a DL response to an initial transmission based on whether the response is an ACK or a NACK.

Figure 15:
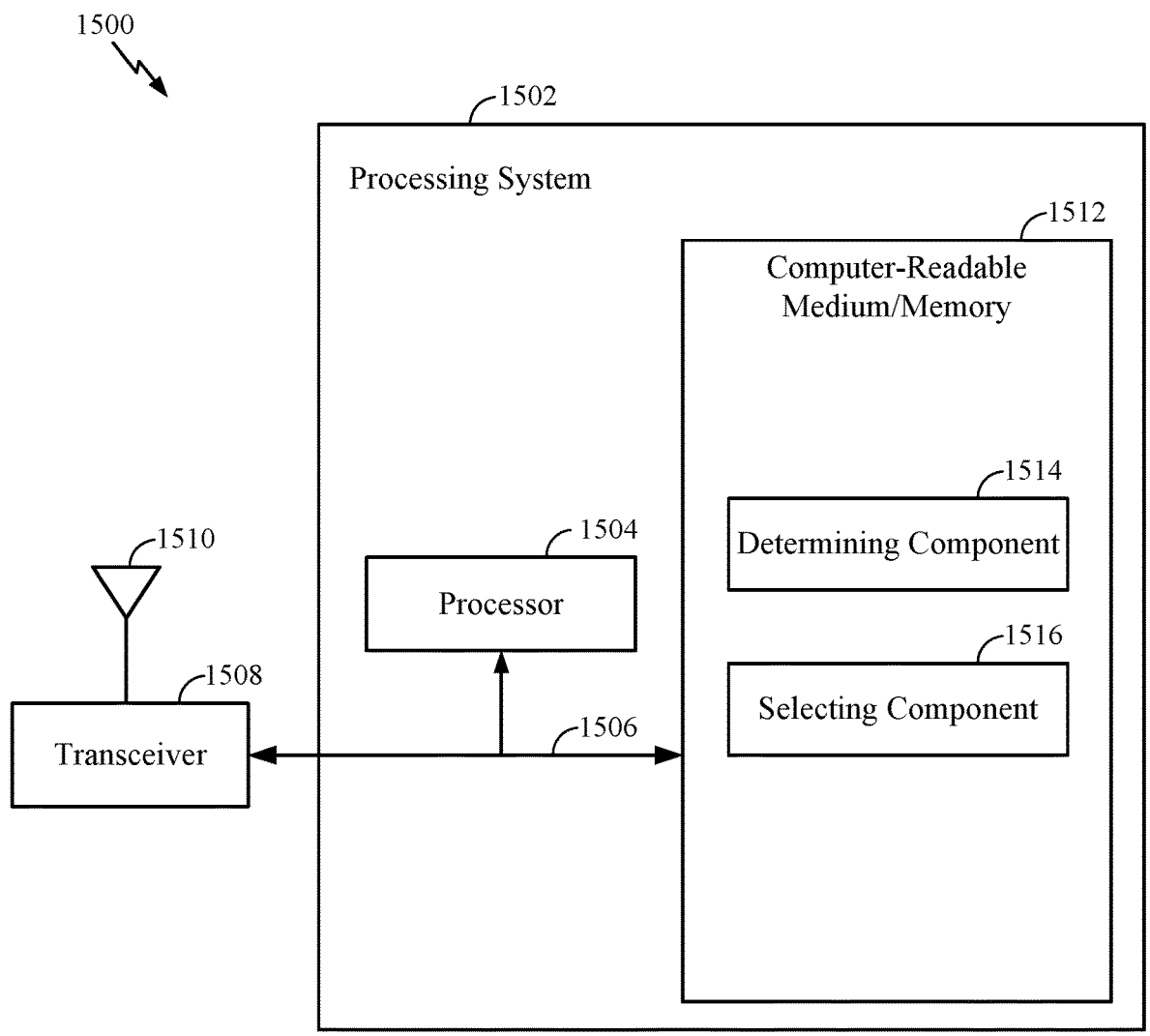
FIG. 15 illustrates a block diagram of a UE configured to perform response-based resource management, according to aspects of the present disclosure.

FIG. 15 illustrates a communications device 1500, such as a UE that may include various components corresponding to means-plus-function components configured to perform the response-based resource management, described herein. The communications device 1500 includes a processing system 1502 coupled to a transceiver 1508. The transceiver 1508 is configured to transmit and receive signals for the communications device 1500 via an antenna 1510, such as the various signal described herein The processing system 1502 may be configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/ memory 1512 is configured to store instructions that when executed by processor 1504, cause the processor 1504 to perform the operations illustrated in FIG. 10, or other operations for performing the various techniques discussed herein.

In certain aspects, the processing system 1502 further includes a determining component 1514 for performing the determining operations illustrated in FIG. 10. Additionally, the processing system 1502 includes a selecting component 1516 for performing the selecting operation illustrated in FIG. 10. The determining component 1514 and selecting component 1516 may be coupled to the processor 1504 via bus 1506. In certain aspects, the determining component 1514 and the selecting component 1516 may be hardware circuits. In certain aspects, the determining component 1514 and the selecting component 1516 may be software components that are executed and run on processor 1502.

Figure 16:
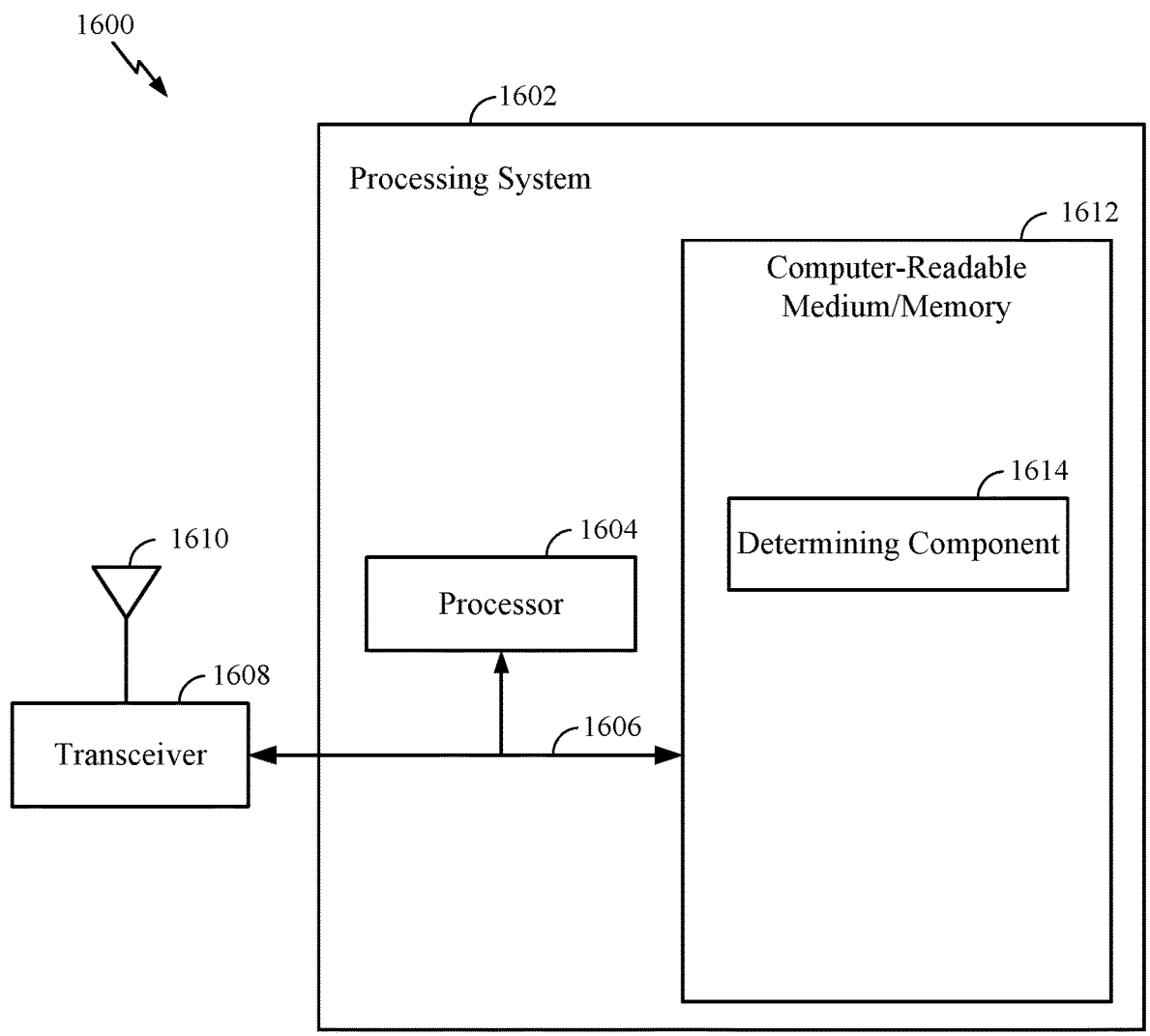
FIG. 16 illustrates a block diagram of a TRP configured to perform response-based resource management, according to aspects of the present disclosure.

FIG. 16 illustrates a communications device 1600, such as a TRP that may include various components corresponding to means-plus-function components configured to perform the response-based resource management, described herein. The communications device 1600 includes a processing system 1602 coupled to a transceiver 1608. The transceiver 1608 is configured to transmit and receive signals for the communications device 1600 via an antenna 1610, such as the various signal described herein The processing system 1602 may be configured to perform processing functions for the communications device 1600, including processing signals received and/or to be transmitted by the communications device 1600.

The processing system 1602 includes a processor 1604 coupled to a computer-readable medium/memory 1612 via a bus 1606. In certain aspects, the computer-readable medium/ memory 1612 is configured to store instructions that when executed by processor 1604, cause the processor 1604 to perform the operations illustrated in FIG. 12 or 13, or other operations for performing the various techniques discussed herein.

In certain aspects, the processing system 1602 further includes a determining component 1614 for performing the determining operations illustrated in FIGS. 12 and/or 13. The determining component 1614 may be coupled to the processor 1604 via bus 1606. In certain aspects, the determining component 1614 may be hardware circuits. In certain aspects, the determining component 1614 may be software components that are executed and run on processor 1602.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIGS. 10, 12, and 13.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user equipment (UE), comprising:
    determining an uplink response to be transmitted in response to a downlink transmission by a first transmit/receive point (TRP) participating in coordinated multipoint (CoMP) transmissions to the UE with a second TRP;
    selecting which of the first TRP or the second TRP to transmit the uplink response to, based at least in part on the determined uplink response, wherein the selecting comprises:
        selecting the first TRP when the uplink response comprises an acknowledgement (ACK); and
        selecting the second TRP when the uplink response comprises a negative acknowledgment (NACK); and
    transmitting the uplink response to the selected first or second TRP.

2. The method of claim 1, wherein the uplink response comprises one of an acknowledgement (ACK) or a negative acknowledgement (NACK).

3. The method of claim 1,
    wherein a first set of time-frequency resources are allocated to the first TRP and a second set of time-frequency resources are allocated to the second TRP, and
    wherein transmitting the uplink response comprises:
        transmitting the ACK using the first set of time-frequency resources; or
        transmitting the NACK using the second set of time-frequency resources.

4. The method of claim 1, when the uplink response comprises the NACK, further comprising:
    after transmitting the NACK, receiving a retransmission of the downlink transmission from the second TRP.

5. The method of claim 1, when the uplink response comprises the NACK, further comprising:
    after transmitting the NACK, receiving a downlink control channel transmission from the second TRP.

6. The method of claim 1, wherein the UE communicates with each of the first and second TRPs using ultra-reliable low latency communication (URLLC).

7. An apparatus for wireless communication by a user equipment (UE), comprising:
    a memory coupled to a processor and instructions stored in the memory that, when executed, cause the processor to:
        determine an uplink response to be transmitted in response to a downlink transmission by a first transmit/receive point (TRP) participating in coordinated multipoint (CoMP) transmissions to the UE with a second TRP;
        select which of the first TRP or the second TRP to transmit the uplink response to, based at least in part on the determined uplink response, wherein the instructions for selecting comprises instructions for:
            selecting the first TRP when the uplink response comprises an acknowledgement (ACK); and
            selecting the second TRP when the uplink response comprises a negative acknowledgement (NACK); and
        transmit the uplink response to the selected first or second TRP.

8. The apparatus of claim 7, wherein the uplink response comprises one of an acknowledgement (ACK) or a negative acknowledgement (NACK).

9. The apparatus of claim 7,
    wherein a first set of time-frequency resources are allocated to the first TRP and a second set of time-frequency resources are allocated to the second TRP, and
    wherein the instructions that cause the processor to transmit the uplink response comprise instructions for:
        transmitting the ACK using the first set of time-frequency resources; or
        transmitting the NACK using the second set of time-frequency resources.

10. The apparatus of claim 7, wherein when the uplink response comprises the NACK, after transmitting the NACK, instructions further cause the processor to receive a retransmission of the downlink transmission from the second TRP.

11. The apparatus of claim 7, wherein when the uplink response comprises the NACK, after transmitting the NACK, instructions cause the processor to receive a downlink control channel transmission from the second TRP.

12. The apparatus of claim 7, wherein the UE communicates with each of the first and second TRPs using ultra-reliable low latency communication (URLLC).

* * * * *